Nov. 18, 1941.  B. G. PIERSON  2,262,962
CONTROL SYSTEM
Filed Aug. 16, 1937  3 Sheets—Sheet 1

Inventor
Byron G. Pierson
By George H Fisher
Attorney

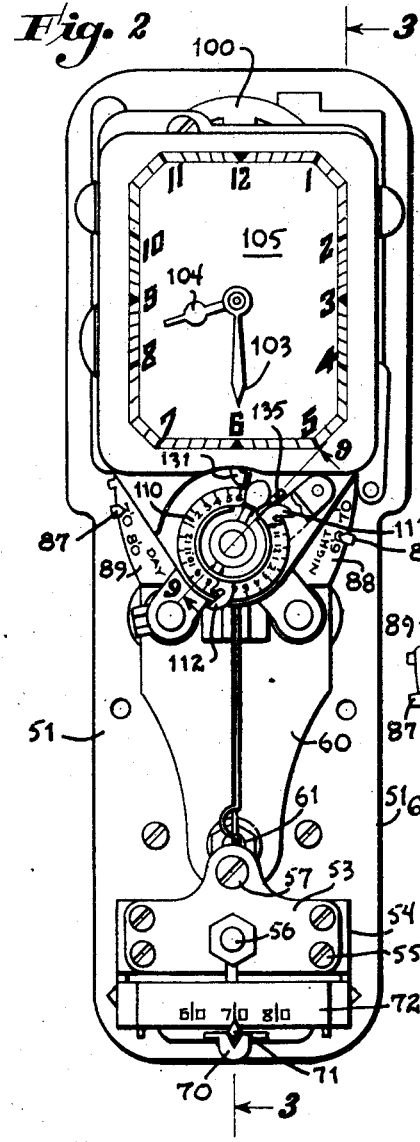

Nov. 18, 1941.  B. G. PIERSON  2,262,962
CONTROL SYSTEM
Filed Aug. 16, 1937  3 Sheets-Sheet 3
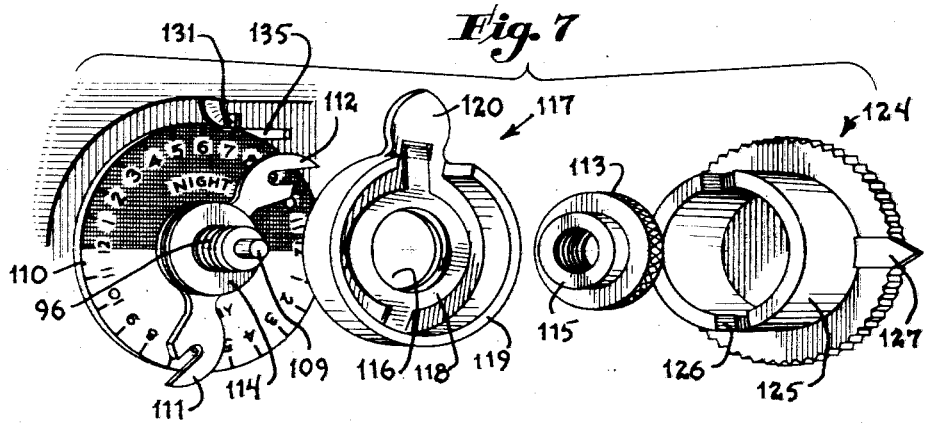
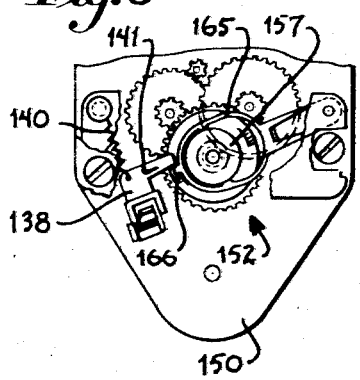
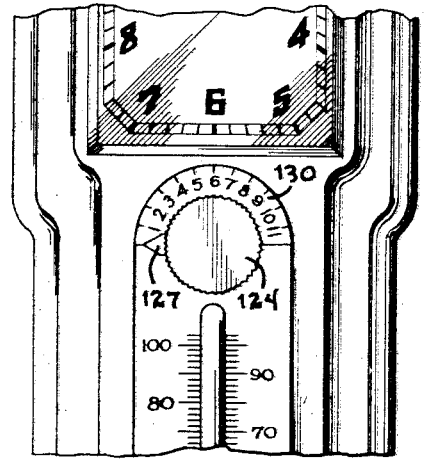
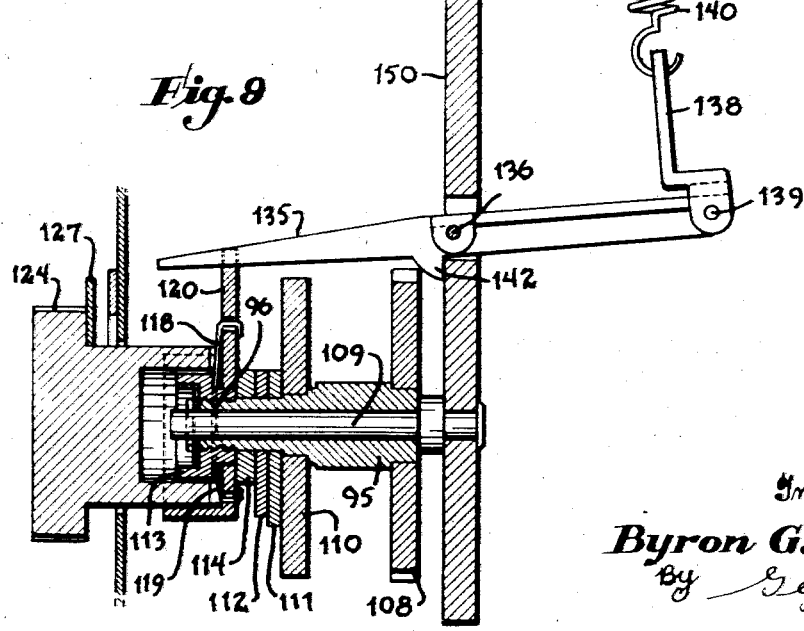
Inventor
Byron G. Pierson
By George H Fisher
Attorney Patented Nov. 18, 1941

2,262,962

UNITED STATES PATENT OFFICE 2,262,962

CONTROL SYSTEM

Byron G. Pierson, Minneapolis, Minn., assignor to Minneapolis-Honeywell Regulator Company, Minneapolis, Minn., a corporation of Delaware Application August 16, 1937, Serial No. 159,339

17 Claims. (Cl. 236—46)

This invention relates to a thermostatic control for a temperature changing system, and more particularly to improvements to a clock thermostat of the type disclosed in the patent to A. G. McNicoll, No. 2,041,363, issued May 19, 1936.

This patent discloses a clock thermostat having provisions for automatically changing the setting of the thermostat at different times during the day. Thus, if it is desired to maintain a temperature of 72 degrees between 6 a. m. and 10 p. m. and a temperature of 60 degrees between 10 p. m. and 6 a. m., the setting of the thermostat is automatically changed to maintain these temperatures at these times.

It is often desirable to maintain the day temperature for a certain time during the night period, or to maintain the night temperature for a certain time during the day period. For example, if the occupants of the building are to be absent on a cerain day until 5 p. m. for example, there may be no necessity of maintaining a temperature of 72° all this time. It would be more economical to let the temperature drop to 60° for example, until shortly before the occupants return home, and to then have the temperature rise to 72°. The only way that this result could be accomplished with the instrument disclosed by McNicoll would be to change the controller whereby the night temperature is maintained until the desired time. This necessitates removing the outer casing of the instrument to make the adjustment, and unless the instrument is readjusted the next day, it will not revert to its normal cycle of operation.

When the casing of the instrument is in place, one cannot tell at what times the instrument is set to change from day to night setting and vice versa, since the means are completely enclosed by the cover and are not intended to be changed at frequent intervals. For this reason, if the setting is changed to take care of particular conditions on a certain day, it would be very easy to forget to change the setting back to normal on the following day since the occupant, by looking at the instrument with the cover in place would have nothing to remind him that it was not properly set. Moreover, this necessity of changing the instrument before and after each unusual condition would be a considerable source of annoyance to the user.

My invention aims to overcome these objections by providing additional means, accessible and operated exteriorly of the casing, for causing the instrument to respond to one setting for a predetermined time during the period it normally responds to the other setting, this being done without in any way affecting the normal setting of the instrument, so that on the following day, unless the additional means is again operated, the instrument will function normally. This additional means is operated by rotating a knob on the front of the instrument, the knob being provided with a pointer cooperating with a graduated dial, the numbers on the dial corresponding to hours. If it is desired to have the instrument on night setting for four hours for example, during the day setting, or vice versa, the knob is turned until the pointer is opposite the numeral 4. At the end of this period, the instrument reverts to its normal operation and no additional adjustment whatever is necessary at the end of this time. It is thus seen that I have provided a very simple adjusting means that in no way affects or changes the other setting of the instrument, and requires a minimum of skill by the user.

It is an object of my invention to provide an improved timed thermostat.

Another object is to provide a novel control means for a temperature changing system.

More specifically, it is an object of my invention to provide, in a thermostat which automatically changes its setting at predetermined times during the day, means for causing the thermostat to respond to one temperature for a predetermined time during a period at which it would normally respond to a different temperature, without otherwise affecting the normal operation of the device.

Other objects of the invention will be apparent upon a study of the specification, claims and drawings, in which like reference characters indicate like parts in the different figures, and in which:

Figure 2 is a view of the thermostat with the outer casing removed,

Figure 3 is a cross-sectional view taken along the line of 3—3 of Figure 2,

Figure 4 is a cross-sectional view taken along the line of 4—4 of Figure 3,

Figure 5 is a cross-sectional view taken on the line of 5—5 of Figure 4,

Figure 6 is a view of a portion of Figure 2 with certain parts removed,

Figure 7 is an exploded view of the control means,

Figure 8 is a view of the clutch mechanism,

Figure 9 is a sectional view of the clutch actuating mechanism, and

Figure 10 is a front view of a portion of the thermostat with the casing in place.

Figure 1:
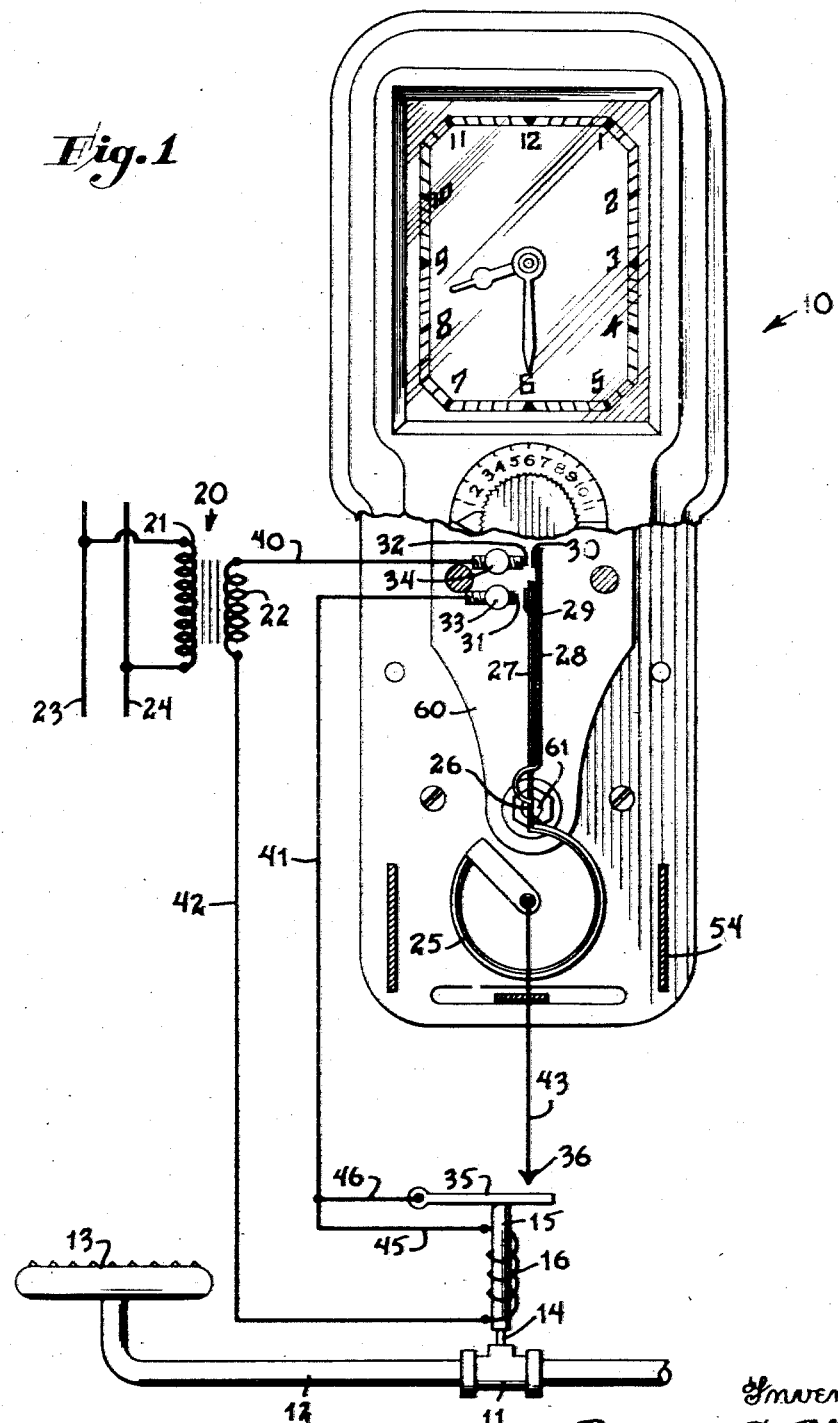
Figure 1 is a view of a temperature control system embodying my invention.

Referring more specifically to Figure 1, I have illustrated a temperature control system employing a thermostat indicated generally by the reference character 10, operatively connected to a control valve 11.

The control valve 11 is mounted in a fuel supply line 12 which directs fuel to a burner 13. Valve 11 has an upstanding valve stem 14 to which is connected an armature 15 located within a solenoid 16. When solenoid 16 is energized it causes armature 15 to move upwardly thereby pulling valve stem 14 upwardly and opening the valve 11. Any suitable means such as a spring (not shown) may be provided for biasing the valve to closed position when solenoid 16 is deenergized.

For energizing the solenoid 16, I have provided a step-down transformer 20 which comprises a high tension coil 21 and a low tension coil 22. High tension coil 21 is connected across a line 23, 24 which in turn is connected to a suitable source of power (not shown).

The thermostat comprises a bimetallic element 25 to which is connected an arm 26 to be moved thereby in response to changes in temperature. Said arm 26 is composed of blades 27 and 28 having at their extremities contacts 29 and 30, respectively. Contacts 31 and 32 are adjustably connected to a plate 60 and are mounted in posts 33 and 34 connected to said plate. Contact 30 is designed to engage contact 32 before contact 29 engages contact 31, and for this purpose blade 28 which carries contact 30 is made flexible so that when its contact engages contact 32, the blade can flex thereby permitting contact 29 to engage contact 31.

When the temperature in a space to be heated drops to a certain predetermined value the bimetallic element 25 will cause movement of arm 26 so that contact 30 will engage contact 32. After further predetermined drop in temperature contact 29 will engage contact 31. A circuit through solenoid 16 will now be established as follows: from the low tension coil 22, conductor 40, contacts 32, 30, blades 28, 27, contacts 29, 31, conductors 41, 45 through solenoid 16 and conductor 42 back to the other side of the low tension coil 22.

Should the temperature at which contact 29 engages contact 31 immediately start to rise, the circuit through solenoid 16 would be deenergized, and this is undesirable since too frequent opening and closing of valve 11 might result. It is therefore desired to keep valve 11 open until the temperature in the space has risen to a value where contact 30 moves away from contact 32. For this purpose a switch 35 which rests on armature 15 is designed to engage a contact 36 when the armature is moved upwardly thus forming a holding circuit for the solenoid which is independent of contacts 29 and 31. This holding circuit is as follows: from the low tension coil 22 through conductor 40, contacts 32 and 30, blade 28, the bimetallic element 25, conductor 43, contact 36, switch arm 35, conductors 46, 45, solenoid 16 and conductor 42 back to the low tension coil 22. In this way the solenoid 16 remains energized until contact 30 moves away from contact 32. When the temperature in the space being heated rises to a value where this happens, the circuit through the solenoid 16 is broken and valve 11 is biased to closed position.

Means are provided whereby the temperature at which the valve 11 is opened, is automatically varied at predetermined times during the day. Reference is made to Figures 2 to 10 for the specific details of this construction.

The thermostat and operating mechanism therefor are mounted on a base 50 which is composed of a plate 51 and a flange 52 as is clearly illustrated in Figure 3. On the lower portion of the base plate 51 as viewed in Figures 2 and 3 is a bridge piece 53 formed of a suitable insulating material, and mounted on flanges 54 upstanding from the plate 51, said bridge piece being secured thereto by means of bolts 55. Connected to the underside of bridge piece 53 is the bimetallic element 25, said element being suitably secured thereto by means of bolts 56 and 57.

The contacts 31 and 32 are mounted in posts 33 and 34 which are in turn secured to the plate 60 which is adjustably connected to the plate 51 by means of a pivot 61. It will be apparent that as plate 60 is moved about its pivot 61, that the contacts 31 and 32 are moved to or from contacts 29 and 30, and in this way the temperature at which contacts 29 and 30 engage contacts 31 and 32 may be varied.

A rock shaft 62 is mounted underneath the plate 51, one end being journalled in an ear 63 formed by bending down a portion of the plate 51 as clearly illustrated in Figure 3, and the other end being journalled in flange 52. On the upper part of the rock shaft 62 is secured a radially extending arm 66 to which is connected an axially extending pin 67. This pin 67 is received between the furcations of a bifurcated member 68 bent down from the plate 60. Figure 6 shows the gap 68a formed by bending the member 68 from plate 60. It will be apparent that as rock shaft 62 is rotated, pin 67, which is moved thereby, will cause plate 60 to move about its pivot 61, thereby adjusting the distance between the contacts 31 and 32 and the contacts 29 and 30. Secured to the lower portion of rock shaft 62 is a radially extending arm 69 connected to the washer 64 rigidly carried by the shaft 62. The outer extremity of shaft 62 has a depending finger piece 70 and an upstanding pointer 71. A graduated dial 72 is located below the bridge piece 53 and pointer 71 sweeps thereover as the arm 69 is moved, thereby rotating shaft 62. The graduations on the dial 72 cooperate with the pointer 71 to indicate at what temperature the thermostat is responsive to close the contacts 30, 32 and 29, 31.

Connected to the upper portion of plate 60, as indicated more particularly in Figure 6, are levers 82 and 83 carrying shoes 80 and 81, respectively. These levers are in the form of bell crank levers and they are pivoted at 84 and 85, respectively, on the plate 60 and the opposite ends of the levers terminate in pointers 86 and 87 which sweep across graduated dials 88 and 89. Located between shoes 80 and 81 is a cam 90 mounted on a shaft 91, this cam being designed to rotate in steps of 180 degrees at predetermined intervals by mechanism to be hereinafter described. The pivots 84 and 85 are relatively stiff as compared with the pivot 61 so that while it requires little effort to move plate 60 about pivot 61, it requires considerable effort to move levers 82 and 83 about their respective pivots so that when force is applied to either shoe 80 or 81, the plate 60 will be moved about its pivot 61. It will thus be seen that as cam 90 rotates through 180° in a clockwise direction, for example, from the position shown, it will engage shoe 80 and cause the plate 69 to be moved about pivot 61 thus moving the contacts 31 and 32 further away from contacts 29 and 30 in which position the thermostat is set for night operation. When the cam 90 again rotates through 180° back to the position illustrated it engages the shoe 81 during its movement thus moving shoe 60 about its pivot 61 in a direction to move the contacts 31 and 32 closer to pivots 29 and 30, thus setting the thermostat for day operation.

The particular setting of the thermostat during the day or night depends upon the positions of shoes 80 and 81 with respect to the cam 90. These positions may be varied by moving the pointers 86 and 87, and the graduated dials 88 and 89 indicate to what temperature the thermostat will be responsive during the day or night. As illustrated, the thermostat is adjusted to maintain a temperature of about 60° at night and about 70° during the day. It is not intended that these shoes 80 and 81 will require frequent adjustment and they will ordinarily be set at the beginning of the heating season to the desired positions and retained in those positions during the entire heating season. If, for some reason, the normal day temperature for example is desired to be raised this may be done by manually adjusting plate 60 by moving finger piece 70. The temperature during the day will therefore be maintained at the value called for until the instrument is automatically changed to its night setting.

Timing means are provided for actuating cam 90 at predetermined times and for varying these times as may be desired. For this purpose an electric motor indicated generally by the reference character 100 and mounted on the upper portion of plate 51 is provided. This motor drives, through reduction gearing 101 and 102, hands 103 and 104 around a clock face 105. Also connected to the motor through the reduction gearing is a continuously rotating gear 108 rigidly connected to a hollow shaft 95 which is in turn journalled on bearing 109 supported from a suitable supporting plate 150 as clearly shown in Figure 9. Shaft 95 terminates in a threaded portion 96. Gear 108 is intended to make one complete revolution every twenty-four hours.

Mounted on shaft 95 and rotated thereby is a dial 110 divided into twenty-four parts, each part representing one hour of the day, as clearly illustrated in Figure 7. Also mounted on shaft 95 for rotation therewith, are cams 111 and 112, these cams being adjustably mounted on said member 95 and being held in adjusted position by means of a nut 113, said nut being threadedly received on the end of shaft 95 and having a reduced portion 115 which is intended to clamp cams 111 and 112 in place, a washer 114 being interposed between the nut and the cams.

The reduced portion 115 of nut 113 passes through an aperture 116 of an operating member generally indicated by reference number 117. Attached to member 117 is a spring 118 having an aperture therethrough as illustrated in Figure 7. The enlarged portion of nut 113 engages spring 117 and when nut 113 is adjusted to clamp cams 111 and 112 in place, it provides through spring 118 a frictional fit between member 117 and the shaft 95, the length of reduced portion 115 of nut 113 being greater than the combined thicknesses of member 117 and spring 118 as shown in Figure 9. The member 117 will rotate with the shaft 95 unless some means prevents this in which case slippage will occur between the member 117 and shaft 95. Member 117 is provided with a cam 120, which in the normal operation of the device is positioned against a stop 131 as illustrated in Figure 2, gear 108 tending to rotate cam 120 in a counter-clockwise direction as viewed in Figure 7. This stop is so arranged, as shown more particularly in Figure 3, that, while it is in the path of movement of cam 120, cams 111 and 112 are permitted to pass below the stop as they rotate with dial 110.

Means are provided to manually move cam 120 in a clockwise direction, with respect to the dial 110, for a purpose to be later described. This means comprises a knob 124 having a cylindrical portion 125 which is tightly received within flange 119 of member 117, said cylindrical portion 125 having recesses 126 for fitting over the ends of spring 118. Knob 124 is provided with a pointer 127 cooperating with a graduated scale 130, Figure 10.

Mounted in the path of movement of cams 111 and 112 is one arm of a lever 135 as clearly illustrated in Figures 7 and 9. This lever is pivoted at 136 to the plate 150, as indicated in Figure 9, and the other end of said lever pivotally supports a trigger 138 to which is connected a spring 140 which normally urges said trigger upwardly as viewed in Figure 9, and the opposite end of said lever 135 into the path of movement of the cams 111 and 112. A stop 142 on lever 135 engages plates 150 to limit the movement of lever 135 by the spring 140. This lever 135 is also located in the path of movement of cam 120 when said cam is manually moved away from stop 131. Trigger 138 is provided with a finger 141 as illustrated in Figure 8 for a purpose to be later described.

Referring more particularly to the clutch mechanism for operating cam 90, reference is made to Figures 4, 5, and 8. Mounted in a plate 151 is the hollow shaft 91, on the inner end of which is rigidly mounted a cam member 154. Telescopically received within shaft 91 is a shaft 155 on which is rigidly mounted a gear 156, said gear being continuously rotated by motor 100, through suitable reduction gearing. Gear 156 is provided with spaced apertures 159. Slidably mounted on shaft 91 is a clutch member 157 having a peripheral groove 164. Clutch member 157 is provided with axially extending pins 158 which pass through suitable apertures in the cam member 154 and are adapted to be received by the apertures 159 in gear 156 when the clutch is engaged, whereby the cam member 154 may be driven by gear 156. On the outer end of shaft 91 is mounted the cam 90 which is held thereon by means of a screw 170 which forces said cam tightly against a washer 172 which is in turn held against a shoulder 173 on the shaft 91.

Mounted within the groove 164 of clutch element 157 is a yoke 165 having a finger 166 on one end thereof, said finger extending parallel to the axis of shaft 91 as illustrated in Figure 4. The other end of yoke 165 is loosely supported on plate 151 by bolt 167 and is urged by a leaf spring 168 toward a position in which clutch element 157 is moved to clutch gear 156 and cam 154 together.

Cam 154 is provided with cam surfaces 160 and 161 as illustrated in Figure 4, these surfaces being spaced 180° apart. With the parts positioned as illustrated in Figure 4, finger 166 of yoke 165 rests upon the cam surface 160 of cam 154, so that clutch element 157 is maintained in a disengaged position. When finger 141 of trigger 138 is moved downwardly from the position illustrated in Figure 8 it engages a shoulder of one of the cam surfaces of cam 154 causing partial rotation of said cam member, thus moving the cam surface out of engagement with the finger 166 of yoke 165. Finger 141 is now positioned between cam member 154 and finger 166 so that movement of yoke 165 by spring 168 is not yet permitted. When finger 141 is returned to the position shown in Figure 8 by spring 140, yoke 165 is moved by spring 168 toward gear 156 and this in turn causes movement of clutch member 157 toward gear 156, in which position pins 158 extend into apertures 159 of gear 156, thereby establishing a driving connection between gear 156 and cam member 154.

Cam member 154 is now rotated through 180° by gear 156, or until cam surface 161 engages finger 166, thus moving yoke 165 and with it clutch member 157 toward plate 151 and declutching gear 156 and cam 154. It is thus seen that each time the trigger 138 is caused to rotate cam 154 to move the cam surface out of engagement with finger 166, that the cam member 154 rotates through 180° and accordingly rotates the cam 90 through 180°, whereupon the rotation of the cam is automatically stopped.

*Operation*

With the thermostat set as illustrated in Figure 2 a temperature of 70° will be maintained between the hours of 7 a. m. and 10 p. m. and a temperature of 60° will be maintained between the hours of 10 p. m. and 7 a. m. Disc 110 is being rotated in a counter-clockwise direction as viewed in Figure 2 and a cam surface 111 is just beginning to engage lever 135. As the disc 110 and the cam 111 rotates, the lever 135 is gradually being forced upwardly as viewed in Figure 9. This movement of the cam causes finger 141 of trigger 138 to move the cam member 154 to a position where the cam surface 160 is out of engagement with finger 166 of yoke 165. This movement, of itself, does not permit movement of the clutch member 157 toward clutching position since finger 141 is interposed between the cam 154 and finger 166.

At the time set for the thermostat to be adjusted to its night setting, the cam 111 passes the lever 135, permitting the lever to assume the position illustrated in Figure 9, in which position finger 141 of trigger 138 is removed from under the finger 166 of yoke 165. Clutch member 157 is now moved by the spring 168 acting through yoke 165 towards clutching position, and cam member 154 is engaged with gear 156, and rotates through 180° as previously described. Cam 90 also rotates through 180° in a clockwise direction as viewed in Figure 6 during which time it engages shoe 80 of plate 60, causing said plate to pivot about point 61 whereupon contacts 31 and 32 are moved away from contacts 29 and 30. The thermostat is now set to maintain a temperature of 60° until such time as the cam 112 moves into engagement with lever 135 and causes cam 90 to again rotate through 180°, during which time it engages shoe 81 and pivots plates 60 together with contacts 31 and 32 back to the position wherein a temperature of 70° will be maintained. As stated heretofore the temperatures maintained during the day and night may be varied by moving pointers 86 and 87 to the desired positions on their respective dials, and the times at which the change from day to night setting and vice versa will occur, may be varied by adjusting cams 111 and 112 to appropriate positions.

Assume that cam 111 has passed lever 135 and the thermostat is now set for 60°, the time being 10 p. m. If now it is desired to maintain the day temperature for a predetermined period, say until 1 a. m. and then have it return automatically to the night setting without any further act on the part of an attendant, it is merely necessary to move knob 124 to a position where pointer 127 is located opposite numeral 3 on the dial 130.

This turning of knob 124 will cause cam 120 to be moved to 1 a. m. on dial 110, and in so moving cam 120, it must pass lever 135 thus causing it to move up from the position shown in Figure 9, said lever moving down again to position illustrated in Figure 9 under the influence of spring 140 when said cam 120 has entirely passed lever 135. This movement of lever 135 again causes clutch element 157 to clutch cam 154 and gear 156 together for 180° in the same manner as when either cam 111 or 112 causes the operation of said clutch. Cam 90 is now moved through 180° from its night position back to its day position thus moving the contacts 31 and 32 to their day positions. The day temperature which with the parts as illustrated in Figure 2, will be 70°, will be maintained until lever 135 and consequently clutch 157 is again operated.

It will be remembered that there is a frictional fit between member 117 which carries cam 120 and driving shaft 95, whereupon cam 120 is caused to move with dial 110 until it abuts stop 131 and further movement is prevented. In so moving toward stop 131, the cam again causes operation of lever 135 and clutch 157 whereupon the cam 90 is again caused to move through 180° thereby resetting the thermostat for night operation. Cam 120 continues movement until it engages stop 131, further movement being prevented by said stop whereupon slippage occurs between the driving shaft 95 and member 117 carrying cam 120.

The thermostat is now returned to its normal night operation, and until further manual movement of cam 120 is imparted thereto by turning knob 124 this cam will have no effect on the operation of the thermostat and the regular night and day operation will thereafter occur.

It is thus seen that the normal operation of cam 120 in no way affects cams 111 and 112 so that any further adjustment of the thermostat is unnecessary after cam 120 has been moved to the desired position. By the use of this cam 120 the normal day or night period of the thermostat may be extended for a predetermined length of time by a simple adjustment from the outside of the thermostat casing with very little effort on the part of the operator. While it is of course possible to have the thermostat maintain a temperature of 70° say during the night period by proper adjustment of finger piece 70 it is necessary for the operator to readjust this member when it is desired to have the thermostat resume normal operation. Such would be of course impossible, should the resident desire to maintain a night temperature for a large portion of the day when he is going to be out of the building, and have it automatically revert to day setting a short time before his return. The only way this could be done with the old type of thermostat as shown in the Mc- Nicoll patent would be to adjust cams 111 and 112 to their proper positions. This entails removing the outer casing of the thermostat to make the adjustment and it is necessary to readjust these cams when it is desired to have the thermostat resume normal operation. This entails a considerable amount of inconvenience on the part of the operator which my improvement seeks to avoid.

While I have illustrated a preferred embodiment of my invention, it is obvious that many changes may be made by those skilled in the art, and I desire it to be understood that my invention is to be limited only by the scope of the appended claims.

I claim as my invention:

1. In a temperature control system, means for changing the temperature in a space, temperature responsive means controlling the operation of the temperature changing means, timing means operative to change the temperature at which the temperature responsive means causes operation of the temperature changing means, whereby the temperature changing means maintains one temperature in the space for a predetermined period of time, and maintains a different temperature in the space for another predetermined period of time, means independent of the normal operation of the timing means for maintaining for a predetermined variable portion of either of said periods the temperature normally maintained during the other period, and means for automatically returning the temperature during said one period at the end of the predetermined portion selected.

2. In a temperature control system, means for changing the temperature in a space, means for controlling said temperature changing means, means for operating said controlling means, said means comprising a thermostatically operated switch, a casing for housing said switch, means located wholly within said casing for periodically mechanically changing the setting of the switch whereby different temperatures for predetermined periods of time cause the operation of said controlling means, means accessible exteriorly of the casing for causing operation of the temperature changing means to maintain for a predetermined portion of either period, the temperature normally maintained during another period, and means for automatically causing said temperature changing means to again maintain said normal temperature for the remainder of said one period.

3. In a device of the class described, a housing, a condition responsive element enclosed by said housing, a switch, means within said housing whereby said switch is operated by the condition responsive element to change circuit connections in response to one condition during a predetermined period and to change circuit connections in response to a second condition during a second predetermined period, and means accessible exteriorly of the casing to cause the switch to respond during a predetermined portion of either period to the condition to which it normally responds during the other period, and to automatically return it to its original condition at the end of said predetermined portion.

4. A thermostat comprising a thermostatic element, a switch, means whereby the switch is operated by the thermostatic element to change circuit connections at one temperature during a predetermined period and to change circuit connections at a second temperature during another predetermined period, and means independent of the normal operation of the first named means to cause the switch to respond during a predetermined portion of either period to the temperature to which it normally responds during the other period, and automatically return it to its original condition at the end of said predetermined portion, the length of said portion being adjustable by said independent means.

5. A thermostat comprising a housing, a thermostatic element enclosed by said housing, a switch, means within said housing whereby said switch is operated by the thermostat to change circuit connections at one temperature during a predetermined period and to change circuit connections at a second temperature during another predetermined period, and means accessible exteriorly of the housing to mechanically adjust said switch to cause it to respond during a predetermined portion of either period to the temperature to which it normally responds during another period, and automatically return it to its original condition at the end of said predetermined portion.

6. A thermostat comprising a thermostatic element, a switch operated thereby, timing means operative to change the temperature at which the switch is operated at predetermined times, and means independent of the normal operation of the timing means for mechanically adjusting the thermostatic element to cause the switch to be operative for a predetermined interval during either period at a temperature to which it would normally be responsive during a different period, and automatically return it to its original condition at the end of said predetermined portion, said predetermined portion being adjustable.

7. A thermostat of the class described comprising a temperature responsive element, a switch operated thereby in response to a predetermined temperature, adjustable means to vary the temperature at which said switch operates, a rotatable cam for causing said adjustment, means for moving said cam at predetermined times a predetermined amount, said means including a timing device, a shaft rotated thereby, a pair of cams rotated by said shaft, a clutch element rotated by said shaft, a clutch element connected to said first named cam, means operated by said either of said last named cams for causing operation of said clutch elements, the angular displacement of said cams determining the time of clutch operation, means causing disengagement of said clutch elements upon movement of said first named cam a predetermined amount, whereby the temperature at which the switch operates is changed at predetermined intervals, and means independent of the last named cams to cause adjustment of the temperature responsive means to cause operation of said switch for a predetermined interval only at a temperature different from that normally maintained during that period.

8. A thermostat comprising a temperature responsive element, a switch operated thereby in response to a predetermined temperature, means to vary the temperature at which the switch operates, a cam rotatable in steps of 180° for operating said means, said temperature responsive element causing operation of said switch at one temperature after one movement of said cam and at another temperature after a second movement of said cam, means for causing intermittent movement of said cam, said means including a timing device, a shaft rotated thereby at a reduced speed, a pair of cams connected to said shaft for rotation therewith, a clutch element rotated by said timing device, a second clutch element connected for rotation with said first named cam, means operated by said last named cams for causing engagement of said clutch elements, said cams being adjustable on said shaft, and their angular displacement determining the time of clutch operation, means causing disengagement of said clutch elements upon movement of said first named cam through 180°, whereby the temperature at which the switch operates is changed at predetermined intervals and means independent of the last named cam to cause adjustment of the temperature responsive means to cause operation of said switch for a predetermined interval only at a temperature different from that normally maintained during that period.

9. In a temperature control system, means for controlling the temperature in a space, means for automatically operating said controlling means to maintain one temperature in said space during a predetermined period and to maintain a different temperature during a second predetermined period, and means for manually changing the temperature during either one of said predetermined periods to that normally maintained during the other predetermined period and automatically returning it again during the same period at the end of a time which may be predetermined at the time the manual change is made.

10. In a temperature control system, a temperature changing device, a thermostat in control thereof, a clock for mechanically adjusting said thermostat to maintain one temperature during one period and another temperature during a second period, means for manually adjusting said thermostat during either one of said periods to maintain the temperature normally maintained during the other period, and means operating automatically during the same period to return the thermostat to its original setting, the length of time during which said manual adjustment is effective being dependent upon the operation of said manual adjusting means.

11. In a temperature control system, a temperature changing device, a thermostat in control thereof, a clock for mechanically adjusting said thermostat to maintain one tepmerature during one period and another temperature during a second period, means operative at all times for manually adjusting said thermostat during either period to the setting normally maintained during the other period, and means for automatically returning said thermostat to its original setting during the same period, the time of such automatic return being adjustable by said manual means.

12. In a temperature control system, means for controlling the temperature in a space, means for automatically operating said controlling means to maintain one temperature in said space during a predetermined period and to maintain a different temperature during a second predetermined period, and means for manually changing the temperature during either of said predetermined periods to that normally maintained during the other predetermined period and automatically returning it again at a time selected by the operation of said manual means.

13. In combination, a control device, a condition responsive device capable of actuating said control device at either of two different values of said condition, a timer including a continuously operating motor for causing said condition responsive device to actuate said control device at one of said condition values for a first period of time and at the other of said condition values for a second period of time, and means manually displaced and automatically returned by said motor for rendering said motor operative to cause said condition responsive device to actuate said control device, for a variable portion of one period, at the condition value at which it normally actuates it during the other period.

14. In combination, a control device, a condition responsive device capable of actuating said control device at either of two different values of said condition, a timer including a continuously operating motor for causing said condition responsive device to actuate said control device at one of said condition values for a first period of time and at the other of said condition values for a second period of time, and a manually settable means having a normal inoperative position, but which when moved out of said position manually, renders said motor operative to cause said condition responsive device to actuate said control device at the condition value other than the one at which it would actuate it if the manually settable means were in its normal position.

15. In combination, a control device, a condition responsive device capable of actuating said control device at either of two different values of said condition, a timer including a continuously operating motor for causing said condition responsive device to actuate said control device at one of said condition values for a first period of time and at the other of said condition values for a second period of time, and a manually settable means having a normal inoperative position, but which when moved out of said position manually, renders said motor operative to cause said condition responsive device to actuate said control device at the condition value other than the one at which it would actuate it if the manually settable means were in its normal position, and connecting means between said motor and manually settable means for slowly returning said last named means to its normal position at which time it again renders said motor operative to cause said condition responsive device to actuate said control device at the original condition value, the time required to return said manually settable means depending upon the extent to which it was moved from its original position.

16. In combination a control device, a condition responsive device capable of actuating said control device at either of two different values of said condition, a timer including a continuously operating motor for causing said condition responsive device to actuate said control device at one of said condition values for a first period of time and at the other of said condition values for a second period of time, and means manually displaced and automatically returned by said motor for rendering said motor operative to cause said condition responsive device to actuate said control device, for a variable portion of one period, at the condition value at which it normally actuates it during the other period, and means for independently varying each of said two condition values.

17. In combination, a control device, a condition responsive device capable of actuating said control device at either of two different values of said condition, a timer including a continuously operating motor for causing said condition responsive device to actuate said control device at one of said condition values for a first period of time and at the other of said condition values for a second period of time, and means manually displaced and automatically returned by said motor for rendering said motor operative to cause said condition responsive device to actuate said control device, for a variable portion of one period, at the condition value at which it normally actuates it during the other period, a casing inclosing said condition responsive device and timer, said casing being provided with an opening through which a portion of said manually settable means extends whereby it can be actuated from outside the casing, and a scale cooperating with said manually settable means for indicating its position relative to its normal position at all times.

BYRON G. PIERSON.